US008870419B2

(12) United States Patent
Willemsen et al.

(10) Patent No.: US 8,870,419 B2
(45) Date of Patent: Oct. 28, 2014

(54) LIGHTING SYSTEM WITH GRAVITY CONTROLLED LIGHT BEAM

(75) Inventors: Oscar Hendrikus Willemsen, Eindhoven (NL); Michel Cornelis Josephus Marie Vissenberg, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/393,838

(22) PCT Filed: Sep. 7, 2010

(86) PCT No.: PCT/IB2010/054018

§ 371 (c)(1),
(2), (4) Date: Mar. 2, 2012

(87) PCT Pub. No.: WO2011/033414

PCT Pub. Date: Mar. 24, 2011

(65) Prior Publication Data

US 2012/0162963 A1 Jun. 28, 2012

(30) Foreign Application Priority Data

Sep. 17, 2009 (EP) .................................... 09170490

(51) Int. Cl.

| | |
|---|---|
| ***F21V 21/36*** | (2006.01) |
| ***F21S 8/00*** | (2006.01) |
| ***F21V 21/26*** | (2006.01) |
| ***B60Q 1/14*** | (2006.01) |
| ***F21V 3/00*** | (2006.01) |
| ***F21V 5/00*** | (2006.01) |
| ***F21V 17/02*** | (2006.01) |
| ***F21V 14/04*** | (2006.01) |
| ***F21V 14/06*** | (2006.01) |
| ***F21V 19/02*** | (2006.01) |
| ***F21V 14/02*** | (2006.01) |
| *B60Q 1/26* | (2006.01) |

(52) U.S. Cl.

CPC ................ *F21V 14/02* (2013.01); *F21V 14/04* (2013.01); *F21V 14/06* (2013.01); *F21V 5/007* (2013.01); *F21V 19/02* (2013.01); *F21V 17/02* (2013.01)

USPC ........... 362/403; 362/277; 362/268; 362/269; 362/232; 362/280; 362/311.06; 362/319; 362/449

(58) Field of Classification Search

CPC ......... F21V 14/02; F21V 14/06; F21V 14/04; F21V 19/02; F21V 17/02; F21V 21/38; F21V 21/36; F21V 21/116

USPC .............. 362/84, 247, 232, 268, 269, 296.01, 362/297, 311.06, 311.07, 277, 282–287, 362/319, 341, 372, 418, 449, 280

See application file for complete search history.

(56) References Cited

U.S. PATENT DOCUMENTS 2,710,395 A 2/1953 Dolan
3,860,811 A 1/1975 Slauter (Continued)

FOREIGN PATENT DOCUMENTS

DE 3926618 A1 2/1991
DE 19522112 A 1/1997

(Continued)

*Primary Examiner* — Ismael Negron
*Assistant Examiner* — William N Harris
(74) *Attorney, Agent, or Firm* — Yuliya Mathis

(57) ABSTRACT

A lighting system (10, 50, 70, 90) is provided comprising at least one light source (21, 91) and at least a first optical element (22, 92). The light source (21, 91) generates a light beam (12) and the first optical element (22, 92) refracts the light beam (12). The light source (21, 91) and the first optical element (22, 92) are arranged such that the light source (21, 91) and/or the first optical element (22, 92) are movable under the influence of a gravitational field in such a way that a distance between the light source (21, 91) and the first optical element (22, 92) is dependent on an orientation of the lighting system (10, 50, 70, 90) with respect to the gravitational field.

12 Claims, 6 Drawing Sheets

(56) References Cited

U.S. PATENT DOCUMENTS

| | | | | |
|---|---|---|---|---|
| 4,124,881 | A | 11/1978 | Haber | |
| 4,913,536 | A | 4/1990 | Barnea | |
| 5,057,983 | A | 10/1991 | Ulrich | |
| 5,375,043 | A | 12/1994 | Tokunaga | |
| 5,438,486 | A | 8/1995 | McNair | |
| 5,774,273 | A | 6/1998 | Bornhorst | |
| 5,775,799 | A * | 7/1998 | Forkner | 362/268 |
| 7,993,030 | B2 * | 8/2011 | Galke et al. | 362/285 |
| 2006/0013005 | A1 | 1/2006 | Jiao | |
| 2009/0044625 | A1 | 2/2009 | Chang | |
| 2011/0090704 | A1 * | 4/2011 | Shyu et al. | 362/326 |
| 2011/0103073 | A1 * | 5/2011 | Jurik | 362/319 |

FOREIGN PATENT DOCUMENTS

| | | | |
|---|---|---|---|
| DE | 19653081 | A1 | 6/1998 |
| DE | 20111906 | A | 2/2002 |
| EP | 1106432 | B1 | 7/2008 |
| GB | 174831 | A | 2/1922 |
| GB | 654175 | A | 6/1951 |
| GB | 2305718 | A | 4/1997 |
| JP | 2001110225 | A | 4/2001 |
| WO | 03008858 | A1 | 1/2003 |
| WO | 2005006312 | A2 | 1/2005 |
| WO | 2005093319 | A1 | 10/2005 |
| WO | 2006072885 | A1 | 7/2006 |

* cited by examiner

LIGHTING SYSTEM WITH GRAVITY CONTROLLED LIGHT BEAM

FIELD OF THE INVENTION

This invention relates to a lighting system comprising at least one light source for generating a light beam and optical elements for manipulating the light beam, the lighting system being arranged in such a way that the characteristics of the light beam are dependent on an orientation of the lighting system with respect to a gravitational field.

BACKGROUND OF THE INVENTION

Such a lighting system is, e.g., known from U.S. Pat. No. 3,860,811, wherein a flashlight emitting beams of different widths is disclosed. The flashlight comprises a light source and a lens for refracting the light coming from the light source. A lens chamber is situated in between the light source and the lens and is in fluid communication with a storage chamber. When the flashlight is in a first orientation, the lens chamber is filled with liquid, and light from the light source passes both the liquid and the lens before leaving the flashlight. When the flashlight is rotated to a second orientation, gravity pulls the liquid out of the lens chamber into a storage chamber outside the light path. The light from the light source then only has to pass the empty lens chamber and the lens before leaving the flashlight. The width and the intensity of the light beam thus depend on the orientation of the flashlight.

One disadvantage of the flashlight of U.S. Pat. No. 3,860,811 is that the lens chamber and the storage chamber must be manufactured and filled with liquid such that they are perfectly sealed in order to prevent the fluid from leaking out. Even a small leak may reduce the quality of the produced light due to evaporation of the liquid. In addition, contamination or small protrusions at the lens chamber surface may cause drops of liquid to stay behind in the lens chamber when all liquid should go to the storage chamber, which leads to undesirable disturbances of the emitted light beam.

Another possible way to obtain gravity-controlled light effects is disclosed in, e.g., the international patent application published under number WO 03/008858 A1, disclosing a lighting system using three tilt switches for detecting an orientation of the system. The tilt switches are coupled to a programmable logic circuit. The programmable logic circuit is coupled to light emitting means arranged for producing various lighting effects, depending upon the detected orientation of the lighting system.

It is a disadvantage of this lighting system that the complex electronics have a risk of malfunctioning. Furthermore, many lighting effects require displacement of optical elements. For electronic control of such displacement, additional complex and bulky actuator components are needed.

OBJECT OF THE INVENTION

It is an object of the invention to provide a gravitationally controlled lighting system without the above mentioned problems.

SUMMARY OF THE INVENTION

According to a first aspect of the invention, this object is achieved by providing a lighting system comprising at least one light source and at least a first optical element. The at least one light source is provided for generating a light beam. The first optical element is provided for changing a beam characteristic of the light beam. The light source and the first optical element are arranged such that the light source and/or the first optical element are movable under the influence of a gravitational field in such a way that mutual positions of the light source and the first optical element are dependent on an orientation of the lighting system with respect to the gravitational field.

Beam characteristics, such as color, width and divergence of the beam coming from the lighting system depend on many factors, such as the divergence and width of the generated beam, the refractive indices of the optical element and the mutual positions of the light source and the optical element. If the orientation of the lighting system with respect to the gravitational field changes, the weight of the optical element or the light source will cause a displacement of said element and a change of the mutual positions of the light source and the optical element. As a result, the way in which the optical element affects the light beam changes. Some or all of the light rays in the light beam may travel a different path than before and may arrive at optical elements at another position or under a different angle. If the gravitational forces change the mutual positions of light sources and optical elements, beam characteristics will change accordingly. The gravitational field influencing the distance between the light source and the optical element will generally be the gravitational field of the earth.

In a preferred embodiment, the lighting system further comprises a second optical element, and the first and the second optical element are comprised in a housing. The second optical element is fixedly attached to the housing and the first optical element is arranged to freely move in between a first position and a second position under the influence of the gravitational field.

In one orientation, the freely moving first optical element falls down in the direction of the fixed second optical element. In another orientation, the freely moving first optical element falls down in a direction away from the fixed second optical element. The shape of the housing or of the blocking elements attached to the housing may determine how far the freely moving optical element is allowed to fall down. In one of the orientations, the fall of the freely moving first optical element may end when it falls upon a surface of the second optical element.

The optical elements may, e.g., be a positive lens, a negative lens, a positive lenslet array or a negative lenslet array or a parabolic reflector. In a preferred embodiment, a positive lens and a negative lens have a substantially equal radius of curvature and the positive lens and the negative lens are arranged such that they substantially fit together when the distance is minimal. At this minimal distance, there will be no net optical effect of the two lenses. A similar effect may be obtained when using a positive and a negative lenslet array, wherein the positive lenslet array and the negative lenslet array have a substantially equal radius of curvature and a substantially equal pitch, wherein the positive lenslet array and the negative lenslet array are arranged such that they substantially fit together when the distance is minimal. Alternatively, the optical element is a reflective mirror which, in one orientation, is in a first predetermined angular position with respect to the light beam of the light source and which changes to a second predetermined angular position with respect to the light beam in another orientation of the lighting system, thus changing the beam direction of the light beam emerging from the lighting system.

Optionally, a surface of the second optical element comprises a transparent colored subpart and the first and the second optical element are arranged such that when the distance has a predetermined value, the colored subpart is situated in a focal point of the first optical element. The transparent colored subpart may comprise a phosphorescent material.

If a parallel light beam is refracted by the first optical element and the transparent colored subpart is at the predetermined distance, the optical element will focus the light beam on the transparent colored subpart. As a result, the color of the light beam will be converted to the color of the transparent colored subpart. The second optical element or a further optical element may then spread the colored light in the environment of the lighting system. When the distance between the first optical element and the second optical element changes, the transparent colored subpart comes out of focus and only a fraction of the light beam will be colored.

For this embodiment it is important that the differently colored subpart only covers a relatively small part of the surface area of the second optical element. The size of the colored subpart is preferably just sufficient for coloring the complete beam when it is situated in or very close to the focal point of the first optical element. When the colored subpart is out of focus, the color of the light beam should mainly be determined by the much larger remaining part of the surface area of the second optical element.

These and other aspects of the invention are apparent from and will be elucidated with reference to the embodiments described hereinafter.

DETAILED DESCRIPTION OF THE INVENTION

Figure 1:
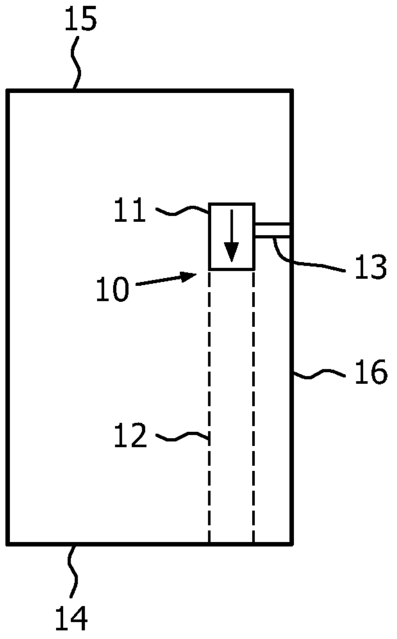
FIG. 1 shows a lighting system according to the invention, illuminating a floor.

FIG. 1 shows a lamp 10 according to the invention, illuminating a floor 14. The lamp 10 comprises a housing 11 and a holder 13 for attaching the housing 11 to, e.g., a wall 16. The orientation of the housing 11 is such that the light 12 from the lamp 10 is directed downwards towards the floor 14. The light beam 12 is substantially parallel and not too wide, which results in a comparatively high intensity illumination suitable for, e.g., reading.

Figure 2:
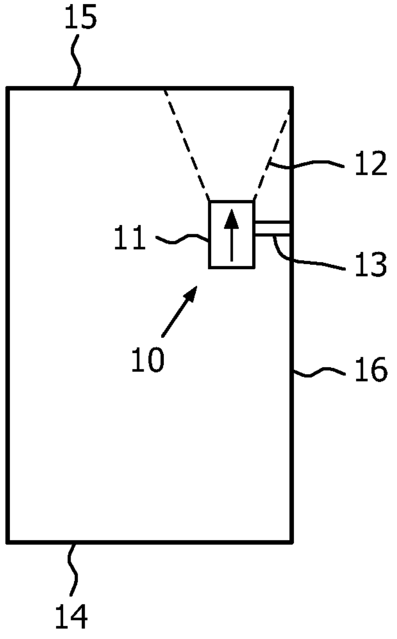
FIG. 2 shows the lighting system of FIG. 1, illuminating a ceiling.

FIG. 2 shows the lamp 10 of FIG. 1, illuminating a ceiling 15. The orientation of the housing 11 may have been changed by, e.g., rotating the housing 11 or the complete lamp 10 including the holder 13. As a result of this rotation, and under the influence of the gravity field of the earth, one or more parameters of the emitted light beam 12 have changed. In this example, the narrow parallel light beam 12 of FIG. 1 is changed into a wider divergent one. As a result, the light 12 illuminates a larger surface area and the intensity of the light is reduced.

Light beam 12 parameters that may be changed include, e.g., beam width, color or color temperature, light intensity or divergence of the light beam 12. Hereinbelow, with reference to FIGS. 3 to 8, several embodiments are described for showing possible ways of letting gravity control some light beam 12 parameters. It is however to be noted that the described embodiments are merely examples of lamps according to the invention and that these and other light beam parameters may be made gravity-dependent in alternative ways falling within the scope of the invention.

Figure 3:
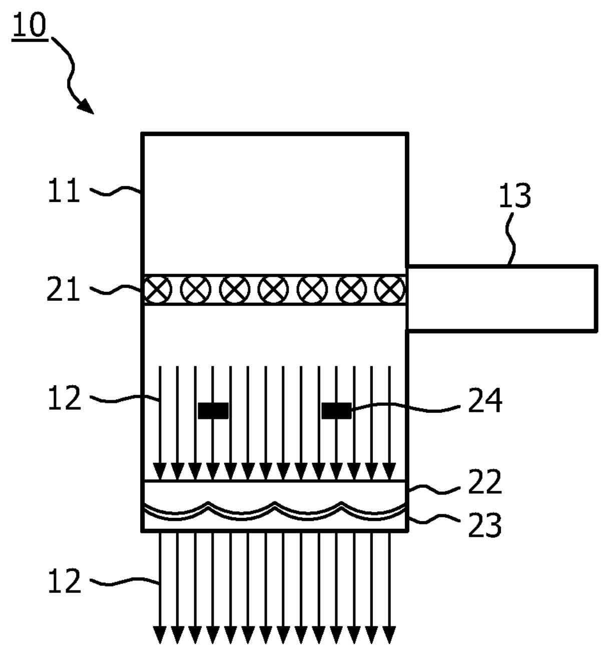
FIG. 3 shows a close-up of the lighting system of FIG. 1.

FIG. 3 shows a close-up of the lamp 10 of FIG. 1. In this close-up it can be seen that the housing 11 comprises a light source 21, optical elements 22, 23 and blocking elements 24. The light source 21 may, e.g., be an array of LEDs or a halogen lamp. Due to the orientation of the housing 11, the light 12 is directed downwards. Before the light 12 leaves the housing 11, it passes two optical elements 22, 23. The first optical element is a positive lenslet array 22 which converges the incoming light beam 12. The second optical element is a negative lenslet array 23 which diverges the light 12 coming from the positive lenslet array 22. In this embodiment, the positive lenslet array 22 is arranged in such a way that it can be moved up or down through the housing 11. The negative lenslet array is fixedly attached to the housing. When the housing 11 is in this orientation, with the light 12 illuminating the floor, the positive lenslet array 22 is pulled down towards the negative lenslet array 23. If the radius of curvature and the pitch of both arrays 22, 23 are equal, the arrays nicely fit together and the combination of the two optical elements 22, 23 will not have a net refractive effect on the light beam 12 coming from the light source 21. If the light source 21 provides a parallel beam, the light beam 12 leaving the housing 11 will also be parallel.

Figure 4:
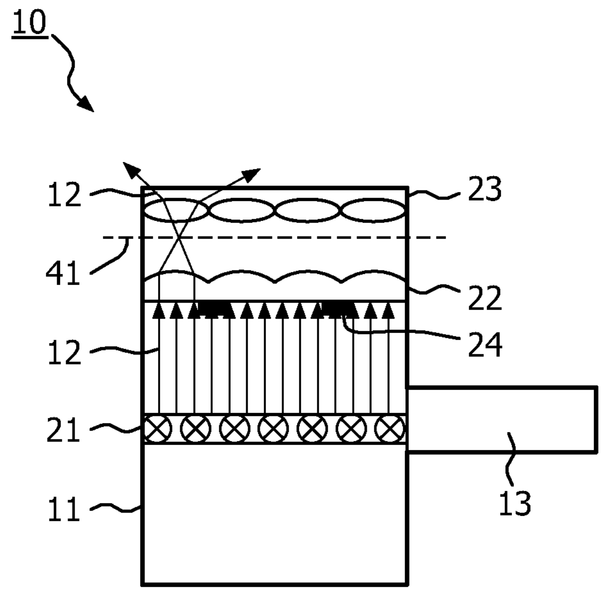
FIG. 4 shows a close-up of the lighting system of FIG. 2.

FIG. 4 also shows a close-up of the lamp 10 of FIG. 2. In fact this is the same lamp 10 as shown in FIG. 3 in another orientation. The light 12 is now directed at the ceiling 15. Due to gravitational forces, the positive lenslet array 22 is pulled down, until its movement is blocked by two blocking members 24 in the housing 11 and the positive lenslet array takes up a predetermined position. Of course, the movement of the positive lenslet array 22 may also be stopped in different ways. For example, the inner diameter of the housing 11 may be such that the lenslet array 22 cannot move beyond the predetermined position. Alternatively, the movement of the lenslet array 22 is blocked by the light source 21. It is to be noted that in both orientations, the light passes the same optical elements. The changing distance between the light source and the optical elements determines the effect of the orientation on the light beam.

In the new position, the positive lenslet array 22 has an increased distance to the negative lenslet array 23. Unlike FIG. 3, the light 12 from the light source 21 does not pass the optical elements without being refracted. The light 12 is now first refracted and diverged by the positive lenslet array. In this example, the light source 21 provides a parallel light beam and each lenslet in the lenslet array creates a focused light spot in the focal plane 41. After the focal plane 41, the light 12 diverges, reaches the negative lenslet array 23 and is refracted to an even more diverged light beam 12 which is very suitable for illuminating larger parts of the ceiling 15. It is to be noted that a similar effect may be obtained when using a positive lens and a negative lens instead of positive and negative lenslet arrays.

Figure 5:
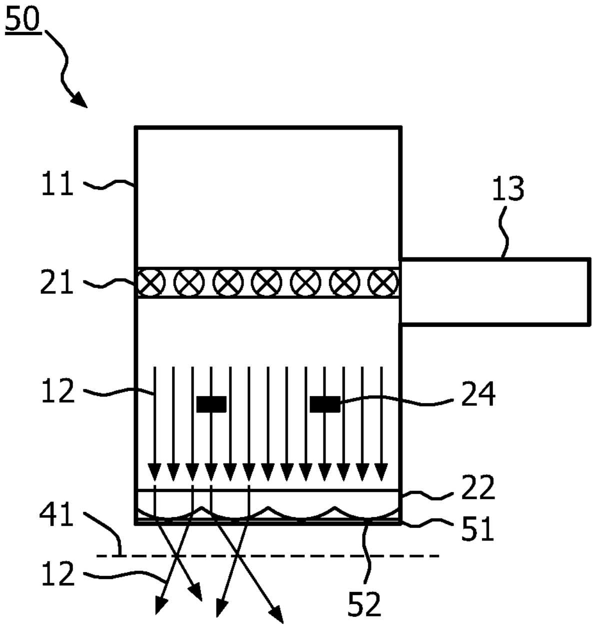
FIG. 5 shows a lighting system capable of providing light of different colors.

FIG. 5 shows a lamp 50 capable of providing light 12 of different colors. In principle this lamp 50 works in the same way as the lamp of FIGS. 3 and 4. There are however two important differences. The first difference is that the negative lenslet array 23 of the previous embodiment is replaced by a transparent element 51. The transparent element 51 does not refract the light 12 coming from the positive lenslet array. The light 12 is converged by the positive lenslet array 22, passes the transparent element and creates spots in the focal plane 41 outside the lamp 50. From those spots, the light 12 diverges to form a divergent bundle of light 12 for illuminating a surface below the lamp 50.

The second difference with the previous embodiment is that the transparent element 51 comprises transparent material of two different colors. Most of the transparent element 51 has a first color. A small part of the transparent element, e.g. 5% or 1%, has a second color. The position of the differently colored spots 52 will be discussed below with reference to FIG. 6. The colored spot 52 may either be integrated in or applied to the transparent element 51. When the lamp 50 is in the orientation shown in FIG. 5, the influence of the small colored spots 52 on the overall color of the light 12 emitted by the lamp 50 is negligible.

Figure 6:
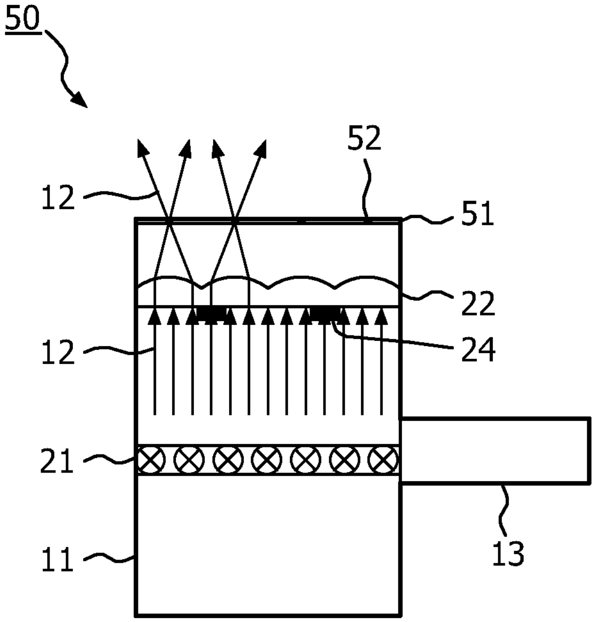
FIG. 6 shows the lighting system of FIG. 5 in another orientation.

FIG. 6 shows the lamp 50 of FIG. 5 in another orientation. Like in FIG. 4, the positive lenslet array 23 falls down and rests on top of the blocking elements 24. In this lamp 50, the blocking elements are placed such that the focal plane of the positive lenslet array 23 coincides with the transparent element 51. If the light source 21 generates a substantially parallel light beam 12, the positive lenslet array 22 creates focused light spots in the plane of the transparent element 51. The colored spots 52 are arranged on or in the transparent element 51, at the positions where the positive lenslet array 22 created the light spots. As a result, most of the light 12 leaving the lamp 50 passes the colored spots 52. The divergent light 12 coming from the lamp 50 thus takes on the color of the colored spots 52 and has a different color than the light emitted by the lamp 50 in the orientation shown in FIG. 5.

Figure 7:
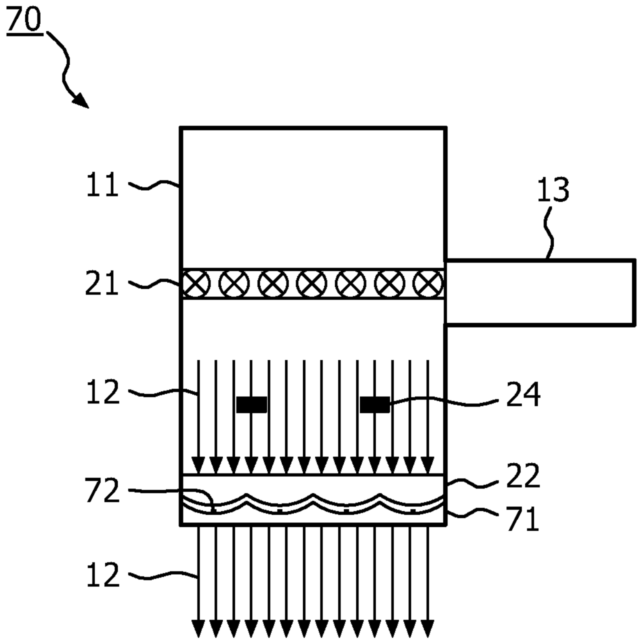
FIG. 7 shows a further lighting system capable of providing light of different colors.
Figure 8:
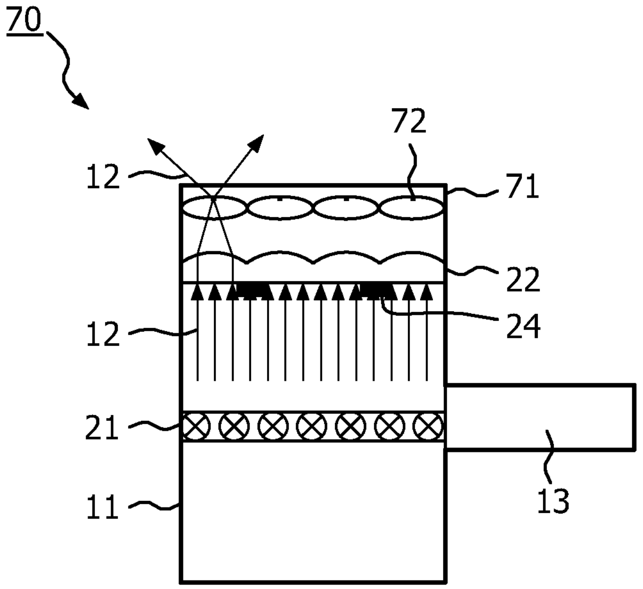
FIG. 8 shows the lighting system of FIG. 7 in another orientation.

FIG. 7 shows a further lamp 70 capable of providing light of different colors. In fact, this lamp 70 is a combination of the lamps 10, 50 of FIGS. 3 and 5. Like the lamp 10 of FIG. 3, this lamp 70 uses a combination of a positive lenslet array 22 and a negative lenslet array 71 with a substantially equal radius of curvature and a substantially equal pitch. On the surface of each lenslet in the negative lenslet array 71, a colored spot 72 is applied. The colored spots 72 may, e.g., be deposited scattering dots of a phosphorescent or other kind of material. In FIG. 7, the lamp is shown in an orientation resulting in a light beam 12 leaving the lamp 70 and being of a color determined by the color of the lenslet arrays 22, 71. FIG. 8 shows the lamp of FIG. 7 in another orientation, wherein the light 12 leaving the lamp 70 is additionally colored by the colored spots 72.

Figure 9:
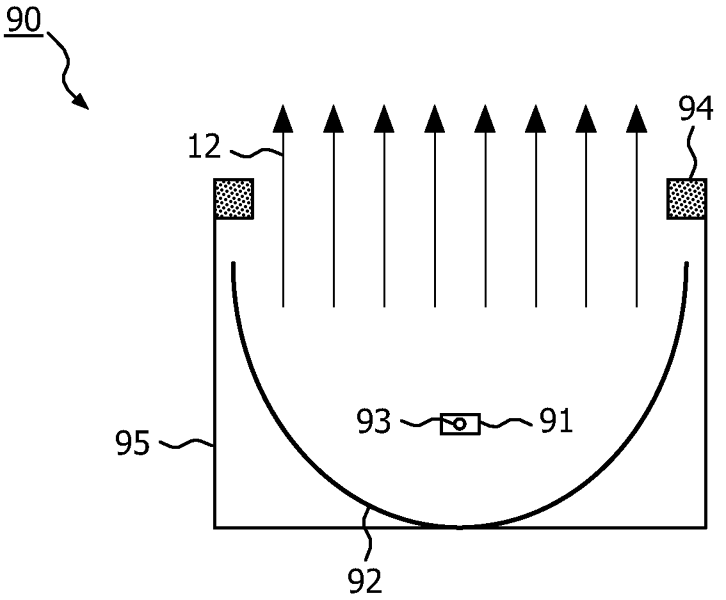
FIG. 9 shows a gravity-dependent lighting system with a parabolic reflector.
Figure 10:
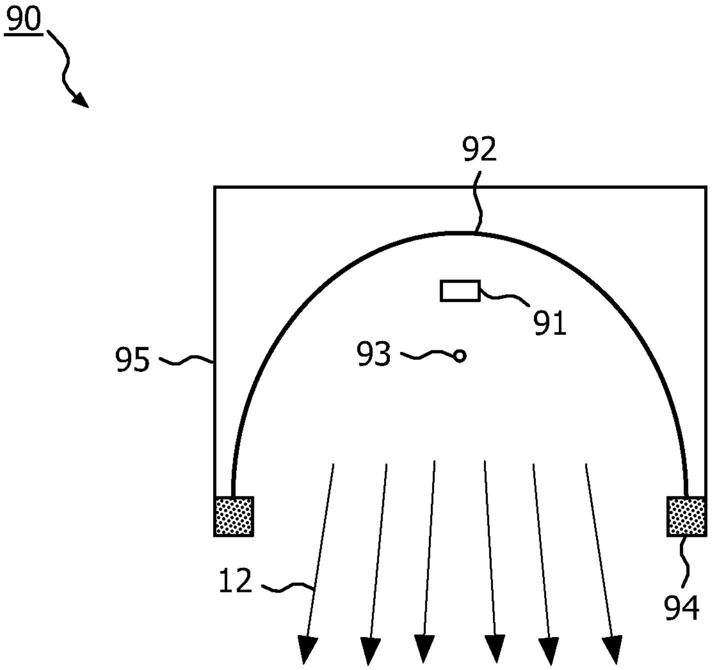
FIG. 10 shows the gravity-dependent lighting system of FIG. 9 in another orientation.

FIG. 9 shows a gravity-dependent lighting system 90 with a parabolic reflector 92. The lighting system 90 comprises a housing 95 with a movable parabolic reflector 92 having a focal point 93 that coincides with the light source 91. In this embodiment, the light source 91 is fixedly attached to the housing 95 and the reflector 92 is arranged to move freely between the lamp housing 95 and blocking elements 94 under the influence of gravity. In the orientation shown in FIG. 9, with the reflector 92 resting on the bottom of the housing 95 and the light source 91 positioned in the focal point 93 of the reflector 92, a bundle of substantially parallel light 12 will leave the lamp 90. FIG. 10 shows the gravity-dependent lamp 90 of FIG. 9 in another orientation. The lamp 90 is turned upside down with respect to the orientation shown in FIG. 9. The reflector 92 now rests on the blocking elements 94. As a result, the light 12 does not come from the focal point 93 of the reflector 92 anymore and is no longer parallel.

It is to be noted that a skilled person could easily amend this embodiment in such a way that the lamp 95 will emit a parallel light bundle 12 when shining down and a divergent bundle when illuminating a ceiling. This may, e.g., be accomplished by positioning the light source 91 such that it is in the focal point 93 in the orientation of FIG. 10. Like in FIGS. 5 to 8, a colored element applied to or integrated within the surface of the reflector 92 may influence the color of the emitted light 12. This influence will be different for a parallel light bundle than it is for a divergent one.

Figure 11A:
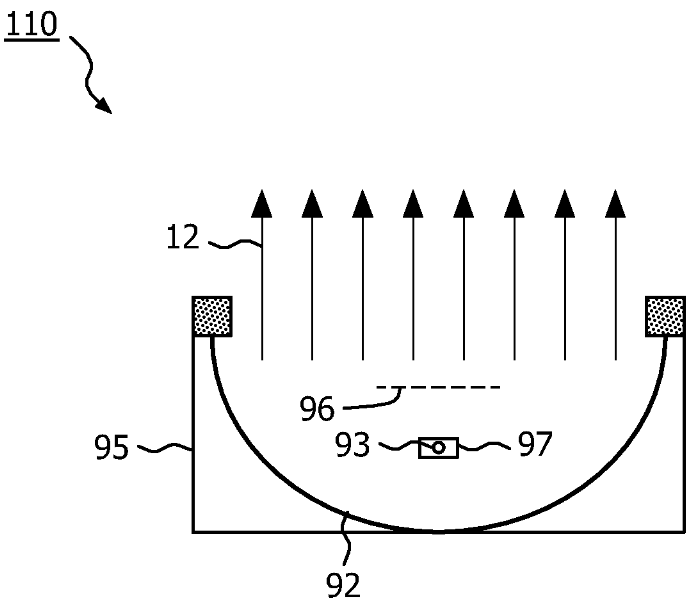
FIGS. 11*a* and 11*b* show a gravity-dependent light system with a movable light source.
Figure 11B:
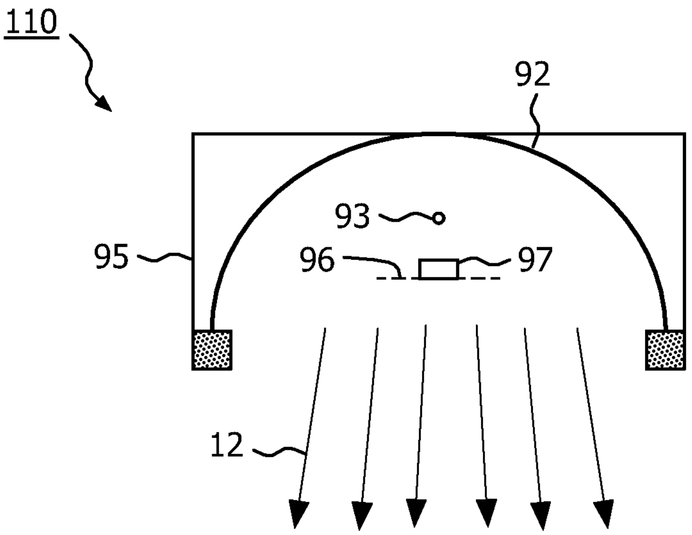

FIGS. 11*a* and 11*b* show a gravity-dependent light system 110 with a movable light source 97. The lighting system 110 comprises a housing 95 with a fixedly attached parabolic reflector 92 having a focal point 93 that coincides with the light source 97. In the orientation shown in FIG. 11*a*, with the light source 97 positioned in the focal point 93 of the reflector 92, a bundle of substantially parallel light 12 will leave the lamp 110. FIG. 11*b* shows the gravity-dependent lamp 110 of FIG. 11*a* in another orientation. The lamp 110 is turned upside down with respect to the orientation shown in FIG. 11*a*. The light source 97 now rests on the blocking element 96. As a result, the light 12 does not come from the focal point 93 of the reflector 92 anymore and is no longer parallel.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting system comprising:

a plurality of LEDs positioned as a light source for generating a light beam, and a moveable lenslet array being a first optical element for changing a beam characteristic of the light beam, the light source and the first optical element being arranged such that the first optical element is movable under the influence of a gravitational field in such a way that mutual positions of the light source and the first optical element are dependent on an orientation of the lighting system with respect to the gravitational field, wherein the orientation changes the beam characteristic from being substantially parallel when the light source is directed downwards toward a floor illuminating a first surface area into being divergent when the light source is directed upwards toward a ceiling illuminating a second surface area, such that the second surface area is larger than the first surface area;

and a second optical element, wherein the first and the second optical element are positioned in a housing, the second optical element fixedly attached to the housing and the first optical element arranged to freely move between a first position and a second position under the influence of the gravitational field;

the second optical element includes a plurality of colored portions;

wherein the first optical element has a first focal point in the first position and a second focal point in the second position, the first focal point different than the second focal point; and, wherein the second focal point is coincident with a plane defined by the plurality of colored portions.

2. A lighting system as claimed in claim 1, wherein the first optical element is a positive lens and the second optical element is a negative lens.

3. A lighting system as claimed in claim 1, wherein the first optical element is a positive lenslet array and the second optical element is a negative lenslet array.

4. A lighting system as claimed in claim 2, wherein the first optical element is situated in between the light source and the second optical element.

5. A lighting system as claimed in claim 2, wherein the positive lens and the negative lens have a substantially equal radius of curvature, and wherein the positive lens and the negative lens are arranged such that they substantially fit together when the distance is minimal.

6. A lighting system as claimed in claim 3, wherein the positive lenslet array and the negative lenslet array have a substantially equal radius of curvature and a substantially equal pitch, and wherein the positive lenslet array and the negative lenslet array are arranged such that they substantially fit together when the distance is minimal.

7. A lighting system as claimed in claim 1, wherein a surface of the second optical element includes a transparent colored subpart forming the colored portions, and wherein the first and the second optical element are arranged such that when a distance between the light source and the first optical element has a predetermined value, the colored subpart is situated in a focal point of the first optical element.

8. A lighting system as claimed in claim 7, wherein the colored subpart comprises a phosphorescent material.

9. A lighting system, comprising:

a plurality of light emitting elements generating a light beam;

a moveable lenslet array which acts to modify the light beam;

a second optical element;

the light emitting elements and the lenslet array arranged such that the movable array is movable under the influence of a gravitational field in such a way that mutual positions of the plurality of light emitting elements and the lenslet array are dependent on an orientation of the lighting system with respect to the gravitational field;

wherein the orientation changes the beam characteristic from being substantially parallel when the plurality of light emitting elements are directed downwards toward a floor illuminating a first surface area into being divergent when the light source is directed upwards toward a ceiling illuminating a second surface area, such that the second surface area is larger than the first surface area;

the lenslet array and the second optical element positioned in a housing;

the second optical element fixedly attached to the housing and the lenslet array arranged to move between a first position and a second position under the influence of the gravitational field;

the second optical element having a plurality of colored spots;

wherein the lenslet array has a first focal point in the first position and a second focal point in the second position, the first focal point different than the second focal point; and, wherein the second focal point is coincident with the plurality of colored spots.

10. The lighting system of claim 9 wherein the colored spots on the second optical element covers about 5% to about 1% of the surface area of the second optical element.

11. The lighting system of claim 10, wherein the second optical element includes a first transparent color and a second transparent color.

12. A lighting system comprising:

at least one light source for generating a light beam and creating a light beam output axis;

a first optical element being a moveable array for changing a beam characteristic of the light beam;

the light source and the first optical element being arranged such that at least one of the light source and the first optical element is movable under the influence of a gravitational field in such a way that mutual positions of the light source and the first optical element are dependent on an orientation of the lighting system with respect to the gravitational field, wherein the orientation changes the light beam from being substantially parallel when the light source is directed downwards toward a floor illuminating a first surface area into being divergent when the light source is directed upwards toward a ceiling illuminating a second surface area, such that the second surface area is larger than the first surface area;

and a second optical element, wherein the first and the second optical element are positioned in a housing;

the second optical element fixedly attached to the housing and the first optical element arranged to freely move between a first position and a second position under the influence of the gravitational field; and, the first optical element moveable along an axis of the light beam output axis.

* * * * *